(12) United States Patent
Carden

(10) Patent No.: US 10,357,090 B2
(45) Date of Patent: Jul. 23, 2019

(54) GLOW-IN-THE-DARK ROTOMOLDED COOLER

(71) Applicant: Gnarwhal Outdoors, LLC, Galveston, TX (US)

(72) Inventor: Ryan Hunter Carden, Galveston, TX (US)

(73) Assignee: Gnarwhal Outdoors, LLC, Galveston, TX (US)

(*) Notice: Subject to any disclaimer, the term of this patent is extended or adjusted under 35 U.S.C. 154(b) by 0 days.

(21) Appl. No.: 16/022,394

(22) Filed: Jun. 28, 2018

(65) Prior Publication Data

US 2019/0000205 A1 Jan. 3, 2019

Related U.S. Application Data

(60) Provisional application No. 62/525,992, filed on Jun. 28, 2017.

(51) Int. Cl.
| | |
|---|---|
| *A45C 15/06* | (2006.01) |
| *A45C 11/20* | (2006.01) |
| *B29C 33/02* | (2006.01) |
| *B29C 33/34* | (2006.01) |
| *B29C 41/04* | (2006.01) |

(Continued)

(52) U.S. Cl.
CPC ............. *A45C 15/06* (2013.01); *A45C 11/20* (2013.01); *B29C 33/02* (2013.01); *B29C 33/34* (2013.01); *B29C 41/04* (2013.01); *B29C 41/46* (2013.01); *B29K 2023/0625* (2013.01); *B29K 2505/02* (2013.01); *B29L 2031/712* (2013.01); *F25D 3/08* (2013.01); *F25D 2327/001* (2013.01); *F25D 2331/804* (2013.01)

(58) Field of Classification Search
CPC ......... A45C 15/06; A45C 11/20; B29C 33/02; B29C 33/34; B29C 41/04; B29K 2023/0625; B29K 2505/02; B29L 2031/712; F25D 3/08; F25D 2327/001; F25D 2331/804
See application file for complete search history.

(56) References Cited

U.S. PATENT DOCUMENTS

| | | | | |
|---|---|---|---|---|
| 7,498,066 B2* | 3/2009 | Kumar | ............ | B05B 7/22 427/569 |
| 2004/0230271 A1* | 11/2004 | Wang | ............ | A61M 25/0045 607/116 |

(Continued)

*Primary Examiner* — Melvin Jones
(74) *Attorney, Agent, or Firm* — Rowan TELS LLC

(57) ABSTRACT

A cooler including a container comprising a linear low-density polyethylene and a glow-in-the-dark additive, a lid comprising the linear low-density polyethylene and the glow-in-the-dark additive and coupleable to the container, each of the container and the lid including an insulation layer, and the glow-in-the-dark additive emitting light when exposed to an external electromagnetic radiation source. A method includes rotomolding a cooler comprising a linear low-density polyethylene polymer and a glow-in-the-dark additive. A method of using a cooler comprising a linear low-density polyethylene polymer and a glow-in-the-dark additive includes exposing the cooler to an external electromagnetic radiation source and removing the cooler from the source, and illuminating the surrounding area with the cooler.

14 Claims, 6 Drawing Sheets

(51) Int. Cl.
*F25D 3/08* (2006.01)
*B29C 41/46* (2006.01)
*B29K 505/02* (2006.01)
*B29L 31/00* (2006.01)
*B29K 23/00* (2006.01)

(56) References Cited

U.S. PATENT DOCUMENTS

2005/0276053 A1* 12/2005 Nortrup ............... F21V 19/001
                                                 362/294
2011/0227487 A1*  9/2011 Nichol ................. G02B 6/0018
                                                 315/158
2017/0156540 A1*  6/2017 Wheatley ............. B67D 1/0016

* cited by examiner

GLOW-IN-THE-DARK ROTOMOLDED COOLER

CROSS-REFERENCE TO RELATED APPLICATIONS

This application claims benefit under 35 U.S.C. 119 to U.S. application Ser. No. 62/525,992, entitled "Glow-in-the-Dark Rotomolded Cooler", filed on Jun. 28, 2017, and incorporated herein by reference in its entirety.

BACKGROUND

A user may not be able see a cooler or the contents of the cooler at night without the use of a light. Without the use of a flash light, light bulb, or other external light source, the cooler and its contents are not visible. Conventional coolers may utilize a light source to illuminate the cooler and its contents while in dark spaces or at night. A cooler with features that enable a customer to see the cooler and the contents of the cooler without an external light source is desired.

BRIEF SUMMARY

The present cooler described herein glows in the dark when exposed to sunlight or any other form of light. The glow may be produced by an additive that is mixed into the material from which the cooler is constructed. By incorporating glow-in-the-dark additives in the rotomolding process, the cooler may glow in the dark, inside and/or outside, after exposure of the inside and/or outside to a light source, such as the sun or a flashlight.

Conventional coolers do not have the ability to glow or illuminate in the dark without the use of a power source and light fixture such as a flashlight, or mounted light bulbs. By contrast, a cooler according to embodiments of this disclosure may glow in the dark after being exposed to sunlight or an other light source. Conventional coolers do not have the ability to glow in the dark, emit their own light, or illuminate their contents without an external light source or power source.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

The disclosed cooler is a rotomolded, glow in the dark cooler. The cooler includes a main body, or container portion, of the cooler to stores food, drinks, ice, etc., and a lid of the cooler. The cooler may glow evenly in the dark from an inside and/or outside surface when that surface is exposed to an external electromagnetic radiation source or internal electromagnetic radiation source.

Figure 1:
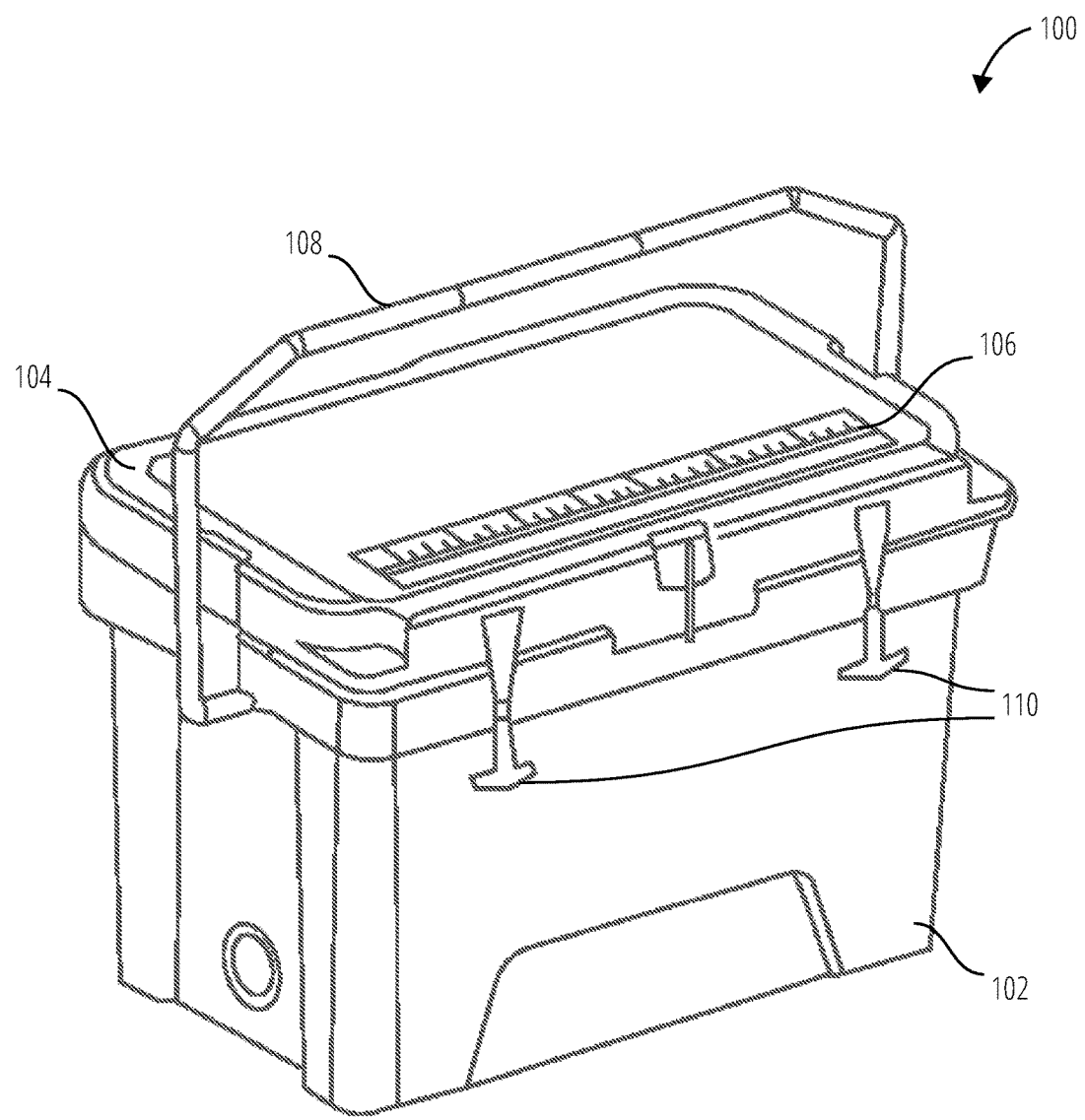
FIG. 1 illustrates an embodiment of a cooler 100 in a closed state.
Figure 2:
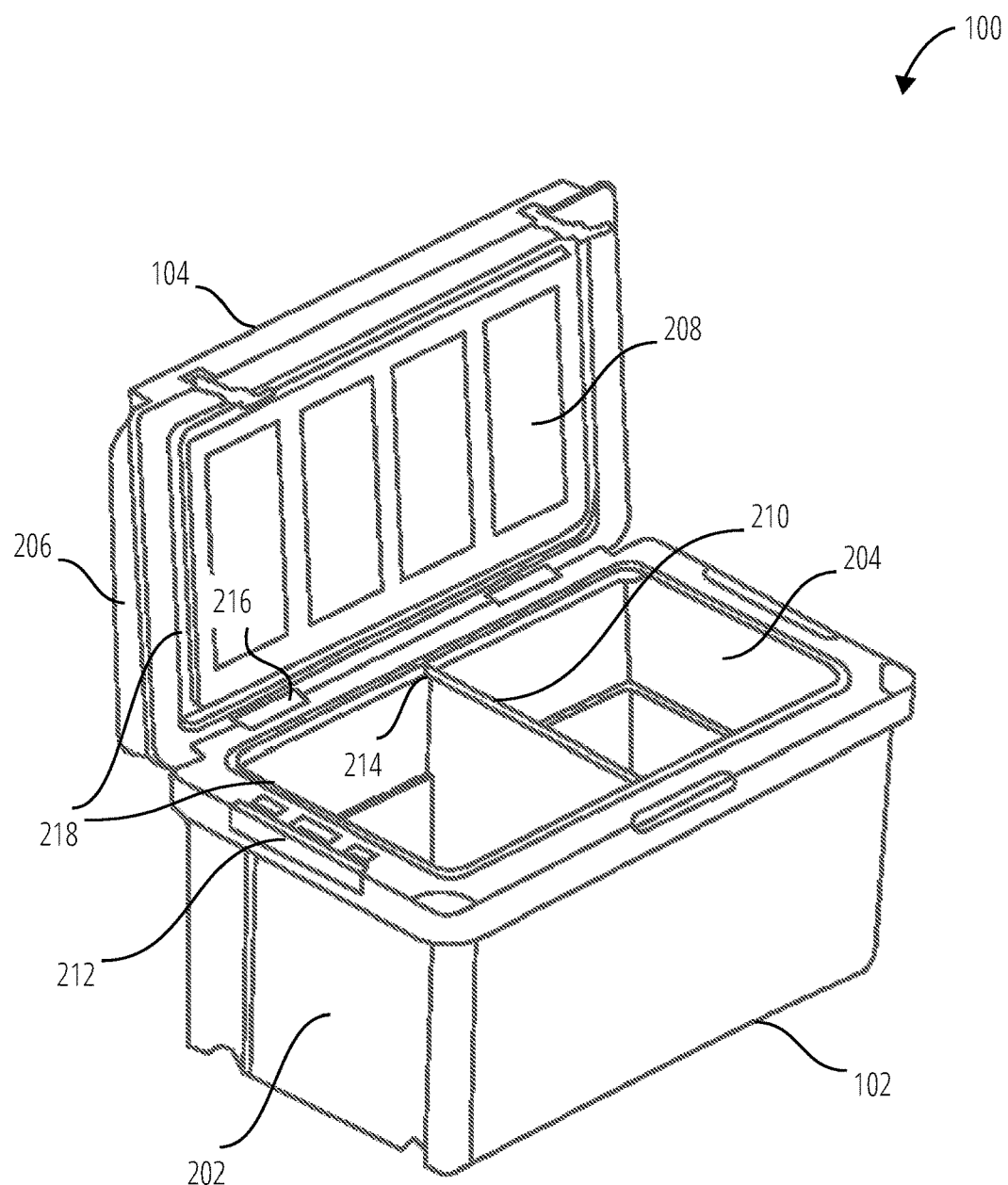
FIG. 2 illustrates an embodiment of a cooler 100 in an open state.

Referring to FIG. 1 and FIG. 2, a cooler 100 comprises a container 102, a lid 104, a detachable device 106, a handle 108, a coupling mechanism 110, a divider 210, an attachment 212, and a seal 218. The container 102 further comprises walls including an outer layer 202 and an inner layer 204, and an attachable slot 214. The lid 104 further comprises an outer layer 206 and an inner layer 208.

The lid 104 is coupled to, or coupleable to, the container 102. The lid 104 may be rotatably coupled to the container 102 utilizing at least one rotatable joint 216. The container 102 may also utilize the coupling mechanism 110 to couple to the lid 104. In some embodiments, the lid 104 is separable from the container 102 and the coupling mechanism 110 is utilized to couple the container 102 and the lid 104. A seal 218 may be attached to the container 102 or the container 102 may be placed in contact with the seal 218 in embodiment in which the seal 218 is attached to the lid 104. A detachable device 106 may attach to the container 102, such as at the attachment 212. The detachable device 106 may then be detached from the container 102. A handle 108 may be coupled to the container 102. The handle 108 may be rotatably coupled to the container 102. The container 102 may further comprise a window, which may be made of a transparent or semi-transparent material to permit light to reach the inner portion of the cooler 100. The container 102 has an outer layer 202 and an inner layer 204. The inner layer 204 may along with the inner layer 208 of the lid 104 define an inner portion of the cooler 100. The inner portion may be utilized to store objects, goods, etc., and be illuminated by the inner layer 204 of the container 102, the inner layer 208 of the lid 104, or the detachable device 106. The inner layer 204 of the container 102 may also have an attachable slot 214. The attachable slot 214 may be a slot, groove, or other receptacle for the divider 210. The container 102 may have a foam layer, such as polyurethane, between the outer layer 202 and the inner layer 204.

The lid 104 is coupled to, or coupleable to, the container 102. The lid 104 may be rotatably coupled to the container 102 utilizing one or more rotatable joints. The lid 104 may also utilize the coupling mechanism 110 to couple to the container 102. In some embodiments, the lid 104 is separable from the container 102 and the coupling mechanism 110 is utilized to couple the lid 104 and the container 102. The seal 218 may be attached to the lid 104, or the lid 104 or may be placed in contact with the seal 218 in an embodiment in which the seal 218 is attached to the container 102. A detachable device 106 may further attached to the lid 104. The detachable device 106 may then be detached from the lid 104. The lid 104 may further comprise a window, which may be made of a transparent or semi-transparent material to permit light to reach the inner portion of the cooler 100. The lid 104 may have an outer layer 206 and an inner layer 208. The inner layer 208 of the lid 104 along with the inner layer 204 of the container 102 may define an interior volume of the cooler 100. The interior volume may be utilized to store objects, goods, etc., and be illuminated by the inner layer 204 of the container 102, the inner layer 208 of the lid 104, or the detachable device 106. The inner layer 208 of the lid 104 may also have an attachable slot. The attachable slot may be a slot, groove, or other receptacle for the detachable device 106. The lid 104 may have an insulation layer, such as a foam layer, between the outer layer 206 and the inner layer 208. The insulation layer may comprise polyurethane.

The detachable device 106 may be attached to the lid 104 (as depicted) or the container 102. The detachable device 106 may be attached to the outer layer of a wall of either component enabling the detachable device 106 to receive electromagnetic radiation, in order to activate (or charge) the detachable device 106. The detachable device 106 may then be detached from the container 102 or the lid 104 and placed within the interior volume of the cooler 100 to illuminate the interior volume of the cooler 100 and activate (or charge) the inner layer 204 of the container 102 and/or the inner layer 208 of the lid 104. The detachable device 106 may have various embodiments, including a detachable stick, a divider 210, or other shape (e.g., ball-shaped) or functional object (e.g., cutting board, shelf, etc.). The detachable device 106 may be attached to a hook or other attachment point on the inner layer 204 of the container 102 or the inner layer 208 of the lid 104.

The handle 108 is rotatably coupled to the container 102. In some embodiments, the handle 108 is made of a metal, such as aluminum or stainless steel. The handle 108 may be utilized for a cooler 100 of a specific interior volume. In other embodiments, such as those of a larger interior volume, the cooler 100 may have a handle 108 comprising a nylon rope or webbing built into the sides of the cooler body near the molded in handle. In some embodiments, the handle 108 is detachable from the container 102.

The coupling mechanism 110 is coupleable to the container 102 and the lid 104. The coupling mechanism 110 may be an elastic material (e.g., rubber) such that, when the coupling mechanism 110 is coupled to both the container 102 and the lid 104, the coupling mechanism 110 exerts a force on both the container 102 and the lid 104, the force may then be transmitted to the seal 218, thereby enhancing the effectiveness of the seal 218.

The attachment 212 may be utilized to attach the detachable device 106 to the outer layer 202 of the container 102. The divider 210 may attach to the container 102 or the lid 104. The divider 210 may also slideably couple to a slot or groove of the inner layer 204 of the walls the container 102. The attachment 212 may be a T-Track built into the physical side of the cooler 100.

The seal 218 may be attached to the container 102 or the lid 104. In either embodiment, when the cooler 100 is in a closed state (as depicted in FIG. 1), the seal 218 contacts the lid 104 or the container 102, respectively, forming a seal between the two components. In some embodiments, the seal 218 is a gasket fitted into a grove in lid 104. The seal 218 may made of heavy duty gasket material and be attached to the lid 104, such that, when the cooler 100 is closed, the seal 218 may make an airtight seal with the cooler body.

The container 102, the lid 104, the detachable device 106, and the divider 210 may comprise linear low-density polyethylene with a glow-in-the-dark additive. In some embodiments, the detachable device 106, the divider 210, and other non-structural components of the cooler 100 may be made of a polyethylene compound, or other plastic compound. The linear low-density polyethylene may be a powder that is rotomolded. The glow-in-the-dark additive may be a powder, pellet, or other form added to the linear low-density polyethylene during the manufacturing process. The glow-in-the-dark additive is activated (or charged) by exposure to an external electromagnetic radiation source. The glow-in-the-dark additive then emits light. The glow-in-the-dark additive may be zinc sulfide, an aluminate, such as strontium aluminate, a mixture that includes either zinc sulfide or aluminate, or other material. The amount (or concentration) of the glow-in-the-dark additive may be about 2 to about 40% of the linear low-density polyethylene by volume. A composition with a lower percentage may result in increased structural integrity and lowered illumination, whereas a composition with a higher percentage may result in less structural integrity with more illumination. A mixture of about 6% by volume may be activated (or charged) in about 4-5 minutes and provide illumination for many hours. Each component may have the same composition or different composition of the glow-in-the-dark additive and the linear low-density polyethylene. For example, the detachable device 106 may have a higher composition of glow-in-the-dark additive compared to the other components. The powder and pellet utilized may be determined based on the color of the linear low-density polyethylene, such that a similar color is perceived in daylight, the reflected color, as the color of the illumination when activated (or charged), the emitted color.

Figure 3:
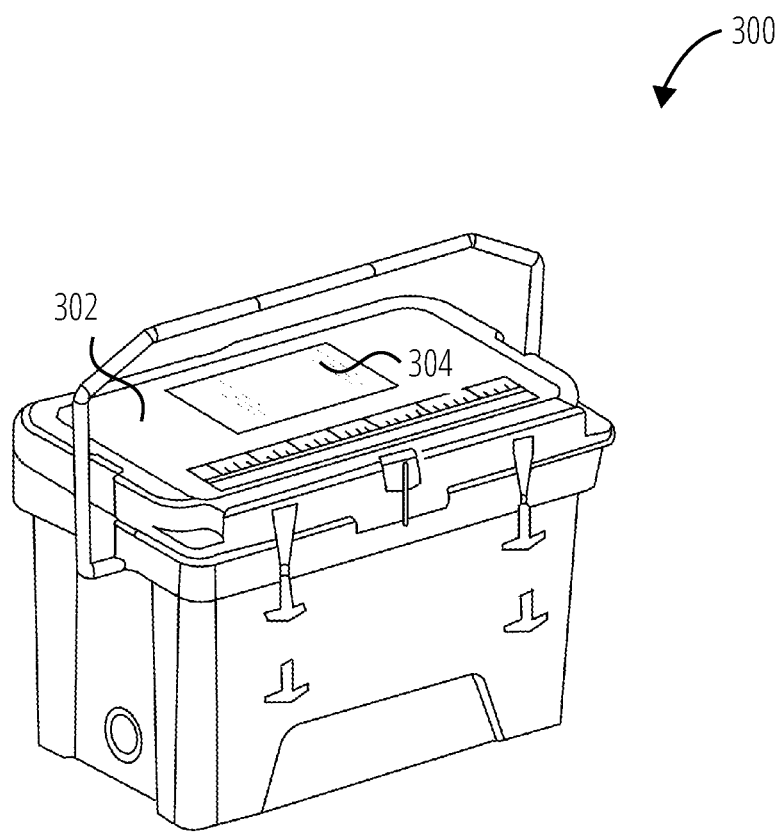
FIG. 3 illustrates a cooler 300 in accordance with one embodiment.

FIG. 3 illustrates a cooler 300 that comprises a lid 302 with a window 304. Window 304 may be made of a transparent or semi-transparent material to permit light to reach the interior volume of the cooler 300. In some embodiments, the window 304 comprises a prism, or any material that refracts light.

Figure 4:
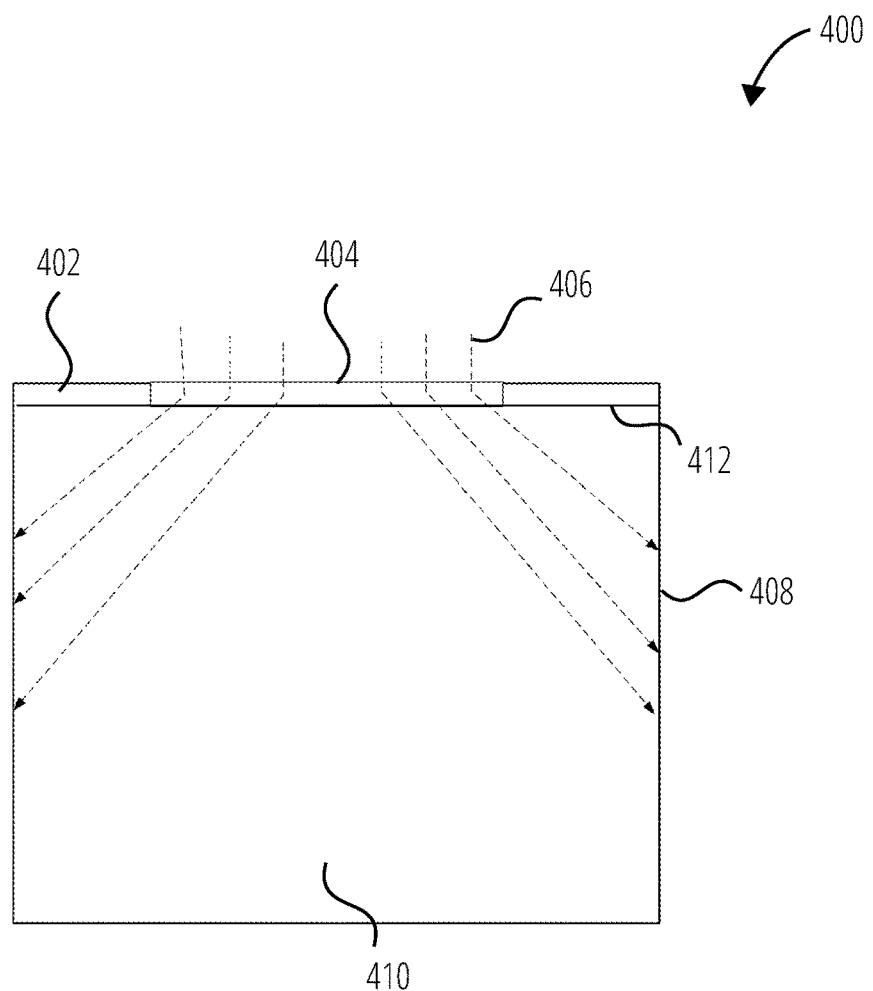
FIG. 4 illustrates a cooler cross section 400 in accordance with one embodiment.

As shown in FIG. 4, a cooler cross section 400 comprises a lid 402 and a window 404 in the lid 402. The window 404 allows light 406 to enter the interior volume 410 of the cooler cross section 400 and contact an inner layer 408 of the cooler and/or the inner layer 412 of the lid 402.

Figure 5:
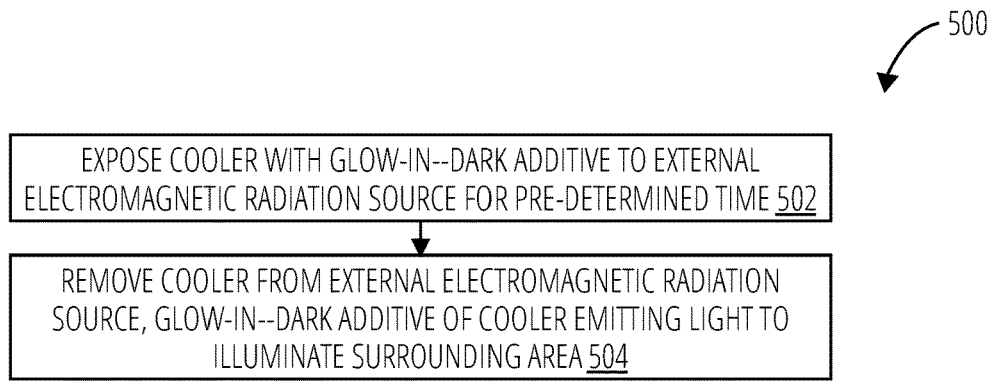
FIG. 5 illustrates an embodiment of a method 500.

Referring to FIG. 5, method 500 exposes the cooler with a glow-in-the-dark additive to an external electromagnetic radiation source for a pre-determined time (block 502). The external electromagnetic radiation source may be sunlight or an artificial light, such as a flashlight. The pre-determined time may be less than five minutes. The cooler is then removed from the external electromagnetic radiation source, the glow-in-the-dark additive of the cooler emitting light to illuminate a surrounding area (block 504). While the cooler remains exposed to the external electromagnetic radiation source, the light may be emitted; however, the cooler may not appear to do so due to the intensity of the external electromagnetic radiation source. The emitted light may illuminate the contents of the cooler, which may be stored within the cooler, as the cooler may be utilized as a storage bin. The cooler may be utilized as a chair or to mark a location at night.

In some embodiments, the cooler comprises a detachable device attached to an outer wall, which may be a detachable stick or divider. The detachable device comprises a glow-in-the-dark additive and is exposed to the external electromagnetic radiation source. The detachable device is then removed from the outer wall of the cooler and placed within the cooler. The glow-in-the-dark additive of the detachable device may then emit light to illuminate the interior volume of the cooler. The inner layer within the cooler may be activated (or charged) by the light emitted by the detachable device and, in response, illuminate the interior volume of the cooler.

The cooler may also have a lid operated to rotate relative to a container on a rotatable coupling to permit exposure of the inner walls of the cooler to the external electromagnetic radiation source. The cooler may also have an indicator that determines whether the inner walls are emitting light.

Figure 6:
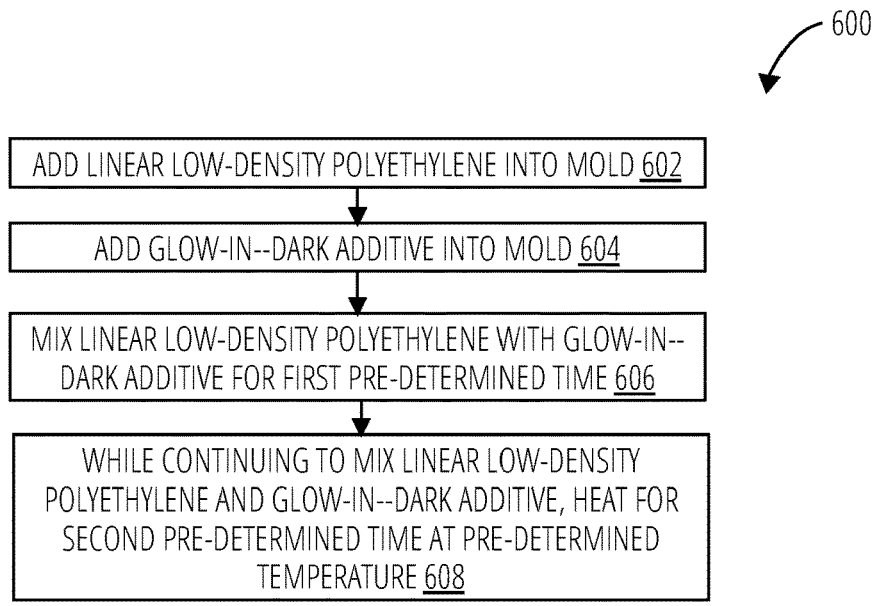
FIG. 6 illustrates an embodiment of a method 600.

Referring to FIG. 6, a method 600 adds a linear low-density polyethylene into a mold (block 602). The mold may be part of a rotational molding machine. Different molds may be utilized for different sized coolers, as well as coolers with different features, such as an aperture in the mold for window, detachable device, etc. The method 600 adds a glow-in-the-dark additive into a mold, creating a loaded mold (block 604). The glow-in-the-dark additive may be a range of percent by weight of the linear low-density polyethylene added, such as between about 2% and about 40% by weight, to emphasize the light emitted versus the structural performance of the cooler. An amount of about 6% by weight ratio may be utilized. The method 600 then mixes the linear low-density polyethylene with the glow-in-the-dark additive for a first pre-determined time to create a polymer blend (block 606). The mixing may occur due to the action of rotomolding. The mixing may result in an even distribution of the glow-in-the-dark additive within the linear low-density polyethylene. The first pre-determined time may be at least as long as it takes for the polymer blend to have a substantially uniform composition. If an even distribution is not achieved, streaking, bands, or blotches may occur in portions of the manufactured cooler, resulting in uneven glowing of various portions of the cooler. The method 600, while continuing to mix the linear low-density polyethylene and the glow-in-the-dark additive, heats the mixture for a second pre-determined time at a pre-determined temperature creating a heated mold (block 608). The second pre-determined time may be at least as long as it takes to fully melt and coalesce the polymer blend on the walls of the mold, and the pre-determined temperature is at least a temperature at which the polymer blend fully melts.

An insulation layer (also known as a foam layer), such as a layer of polyurethane, may be added to the mold after mixing and heating. The container may be molded as a single hollow part having an inner wall and an outer wall spaced apart to define the hollow part. The cooler may be molded with small holes in the bottom. These holes are then used as the fill points for the foam insulation. These holes may then be sealed/covered with non-skid rubber foot pads. The lid may be similarly molded and the holes are sealed and covered with two small rubber plugs. In another embodiment, after molding, holes may be cut in a bottom surface of the external wall to allow the space between the inner and outer walls to be filled with an insulator, such as a foam or other suitable polymeric insulation. In one embodiment, high density polyurethane is used as the insulation material.

In an embodiment a foam may be added to the mold after mixing and heating, including an additional step of allowing the mixture to cool before adding the foam. The mixture may be cooled for about 10 minutes. Various components of the cooler may be rotomolded in the same or different mold and, if different, may be assembled. In some embodiments, the first pre-determined time is about 20 minutes and the second pre-determined time is about 20 minutes. During the second pre-determined time, the temperature of the mixture may be raised to between about 500 to about 700° F. The temperature may also be based on the temperature of a rotomolded plastic cooler without the glow-in-the-dark additive. The temperature may be about 10° F. higher than that optimal temperature.

The glow-in-the-dark additive may be a powder or a pellet. The pellet may be a masterbatch, which are the result of a pre-mixed combination of additive, such as strontium aluminate, and plastic. The glow-in-the-dark additive may include zinc sulfide, strontium aluminate, or other glow-in-the-dark substance. The strontium aluminate may be further activated (or charged) by europium. A glow-in-the-dark additive corresponding to a specific color to be emitted may be selected to be added. The zinc sulfide may have a color spectrum of red, green, blue, or purple. A further lubricant, such as a low molecular weight lubricant, may be added to the mixture. The lubricant may be utilized to inhibit the crystalline structure of the strontium aluminate, which can be abrasive to LLDPE and the molding machinery. In order to avoid an undesirable tint (e.g., pale greenish/yellow) that is common with glow-in-the-dark plastics in the daylight, the strontium aluminate powders may already be pigmented to a color closely resembling the day light color of the linear low-density polyethylene plastic (e.g., an orange linear low-density polyethylene is mixed with a yellowish-orange strontium aluminate powder). These materials and process examples are not intended to be limiting as other compounds and process may be used in other quantities without departing from the scope of the invention.

"Container" herein refers to a device having one or more walls that define an inner space.

"Light" herein refers to electromagnetic radiation within the visible spectrum that is visible to the human eye and is responsible for the sense of sight, defined as having wavelengths in the range of about 400-700 nanometers (nm) between the infrared (with longer wavelengths) and the ultraviolet (with shorter wavelengths).

"External electromagnetic radiation source" herein refers to a device or natural object that emits electromagnetic radiation, such as the Sun, a flashlight, ultraviolet emitter, etc.

"Cooler" herein refers to an insulated container for keeping items, such as food, drinks, medicines, or transplant organs, cool or warm.

What is claimed is:

1. A cooler comprising:
   a container comprising a plurality of walls, the walls including an outer layer, an insulation layer, and an inner layer, wherein the insulation layer is between the outer layer and the inner layer, the walls configured such that the inner layers create an interior volume, the walls including a linear low-density polyethylene and a glow-in-the-dark additive, wherein the glow-in-the-dark additive emits light when exposed to an external electromagnetic radiation source;
   a detachable divider supported within an interior volume of the container, wherein the detachable divider comprises the linear low-density polyethylene and the glow-in-the dark additive; and
   a lid comprising a wall with an outer layer, an insulation layer, and an inner layer, the inner layer of the lid in contact with the interior volume of the container, the wall of the lid including the linear low-density polyethylene and the glow-in-the-dark additive, wherein the lid is coupled to the container.

2. The cooler of claim 1, wherein an outer wall of the cooler comprises an attachment for the detachable divider.

3. The cooler of claim 1, wherein the detachable divider comprises the glow-in-the-dark additive in a higher concentration than a concentration of the glow-in-the-dark additive in at least one of the lid and the container.

4. The cooler of claim 1, wherein the glow-in-the-dark additive is strontium aluminate.

5. The cooler of claim 1, wherein the lid further comprises a window, the window enabling an inner layer of a wall of the container and an inner layer of the wall of the lid to be exposed to the external electromagnetic radiation source.

6. The cooler of claim 1, wherein the container further comprises a window, the window enabling an inner layer of a wall of the container and an inner layer of the wall of the lid to be exposed to the external electromagnetic radiation source.

7. The cooler of claim 6, wherein the window is a prism.

8. A method of manufacturing a cooler, comprising:
adding a linear low-density polyethylene into a mold comprising a hollow part, the mold configured to produce a portion of a cooler;
adding a glow-in-the-dark additive into the mold, thereby creating a loaded mold;
adding a pigment that combines with the linear low-density polyethylene to impart a reflected color to the portion of the cooler in sunlight;
rotating the loaded mold to blend the linear low-density polyethylene with the glow-in-the-dark additive, thereby creating a polymer blend, for a first pre-determined time that is at least as long as it takes for the polymer blend to have a substantially uniform composition;
heating the loaded mold for a second pre-determined time at a pre-determined temperature while continuing to rotate the loaded mold, thereby creating a heated mold, wherein the second pre-determined time is at least as long as it takes to fully melt and coalesce the polymer blend on walls of the mold, and the pre-determined temperature is at least a temperature at which the polymer blend fully melts;
cooling the heated mold;
forming a detachable divider for supporting within the portion of the cooler wherein the detachable divider comprises the linear low-density polyethylene and the glow-in-the-dark additive; and
removing the portion of the cooler from the mold.

9. The method of claim 8, further comprising adding a low molecular weight lubricant to the linear low-density polyethylene while adding the glow-in-the-dark additive.

10. The method of claim 8, wherein the hollow part of the mold comprises an inner layer and an outer wall spaced apart to define the hollow part, and an outer wall of the portion of the cooler comprises at least one aperture, the method further comprising:
adding an insulation layer to the space between the inner and outer walls via the at least one aperture.

11. The method of claim 8, wherein the glow-in-the-dark additive is strontium aluminate.

12. The method of claim 11, wherein the strontium aluminate is at least one of a powder, a pellet, and combinations thereof.

13. The method of claim 11, wherein an amount of strontium aluminate added is in a range of about 2% to about 40% by weight of the linear low-density polyethylene added.

14. The method of claim 11, wherein the amount of strontium aluminate added is in the range of about 2% to about 6% by weight of the linear low-density polyethylene added.

* * * * *